(12) United States Patent
Ward

(10) Patent No.: US 7,545,060 B2
(45) Date of Patent: Jun. 9, 2009

(54) METHOD AND APPARATUS FOR HEAT REMOVAL FROM ELECTRIC MOTOR WINDING END-TURNS

(75) Inventor: Terence G. Ward, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 408 days.

(21) Appl. No.: 11/375,426

(22) Filed: Mar. 14, 2006

(65) Prior Publication Data

US 2007/0216236 A1     Sep. 20, 2007

(51) Int. Cl.
*H02K 9/00* (2006.01)

(52) U.S. Cl. .............................. 310/54; 310/52; 310/89; 310/260

(58) Field of Classification Search ............. 310/52–58, 310/254, 260, 89
See application file for complete search history.

(56) References Cited

U.S. PATENT DOCUMENTS

| 2,844,745 | A | * | 7/1958 | Hamm ......................... 310/57 |
| 4,322,645 | A | | 3/1982 | Spirk et al. |
| 4,396,848 | A | * | 8/1983 | Scheldorf et al. ............. 310/54 |
| 4,644,210 | A | * | 2/1987 | Meisner et al. ............. 310/211 |
| 4,797,588 | A | * | 1/1989 | Capion ......................... 310/54 |
| 4,959,569 | A | * | 9/1990 | Snuttjer et al. ................ 310/53 |
| 5,081,382 | A | | 1/1992 | Collings et al. |
| 5,372,213 | A | * | 12/1994 | Hasebe et al. .............. 180/65.6 |

\* cited by examiner

*Primary Examiner*—Thanh Lam

(57) ABSTRACT

An electric motor includes a stator having a plurality of slots. The slots have slot ends and channels formed between the slot ends. A plurality of wire windings is disposed in the slots. A plurality of winding end-turns is formed by the wire windings and is adjacent to the slot ends. The electric motor also includes a cooling tube connected to a periphery formed by the winding end-turns. The cooling tube is operable to absorb heat from the electric motor. The cooling tube can cool the winding end-turns more efficiently than traditional electric motor water jackets and/or cooling fans.

30 Claims, 8 Drawing Sheets

METHOD AND APPARATUS FOR HEAT REMOVAL FROM ELECTRIC MOTOR WINDING END-TURNS

FIELD OF THE INVENTION

The present invention relates to an electric motor and more particularly relates to liquid cooling of winding end-turns in the electric motor.

BACKGROUND OF THE INVENTION

An electric motor is typically either air cooled or liquid cooled. An air cooled electric motor will typically have air blown over a stator core and wire windings. In this arrangement, the electric motor can be referred to as a non-sealed or open motor such that air is able to blow through the stator core and over the windings. In a closed or sealed motor, air is typically blown across cooling fins on an exterior case of the motor to dissipate waste heat from the motor. In either the non-sealed or the sealed motor, air-cooling provides less complex but relatively inefficient cooling of the electric motor as compared to liquid cooling.

A liquid-cooled electric motor typically has an annular jacket positioned between an outside diameter of the stator core and an inside diameter of the exterior case. Water is circulated through the jacket and around the stator core to remove heat that is produced in the stator core and in the stator windings. Traditionally, the jacket is located relatively far from the winding end-turns. It can be appreciated that heat generated in the winding end-turns travels through the windings and stator core to be extracted by the jacket. The thermal path from the winding end-turns through portions of the stator core to the liquid jacket typically includes many materials with low thermal conductivity, which can reduce cooling to the winding end-turns.

SUMMARY OF THE INVENTION

An electric motor includes a stator having a plurality of slots. The slots have slot ends and channels formed between the slot ends. A plurality of wire windings disposed in the slots. A plurality of winding end-turns is formed by the wire windings and is adjacent to the slot ends. The electric motor also includes a cooling tube connected to a periphery formed by the winding end-turns. The cooling tube is operable to absorb heat from the electric motor.

In other features of the present invention, the cooling device includes a plurality of cooling tubes encircling said winding end-turns circumferentially.

In still other features of the present invention, a wall thickness of the cooling tubes is about five percent of an inner diameter of the cooling tubes.

Further areas of applicability of the present invention will become apparent from the detailed description provided hereinafter. It should be understood that the detailed description and specific examples, while indicating the various embodiments of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

DETAILED DESCRIPTION OF THE VARIOUS EMBODIMENTS

The following description of the various embodiments is merely exemplary in nature and is in no way intended to limit the invention, its application or uses.

Figure 1:
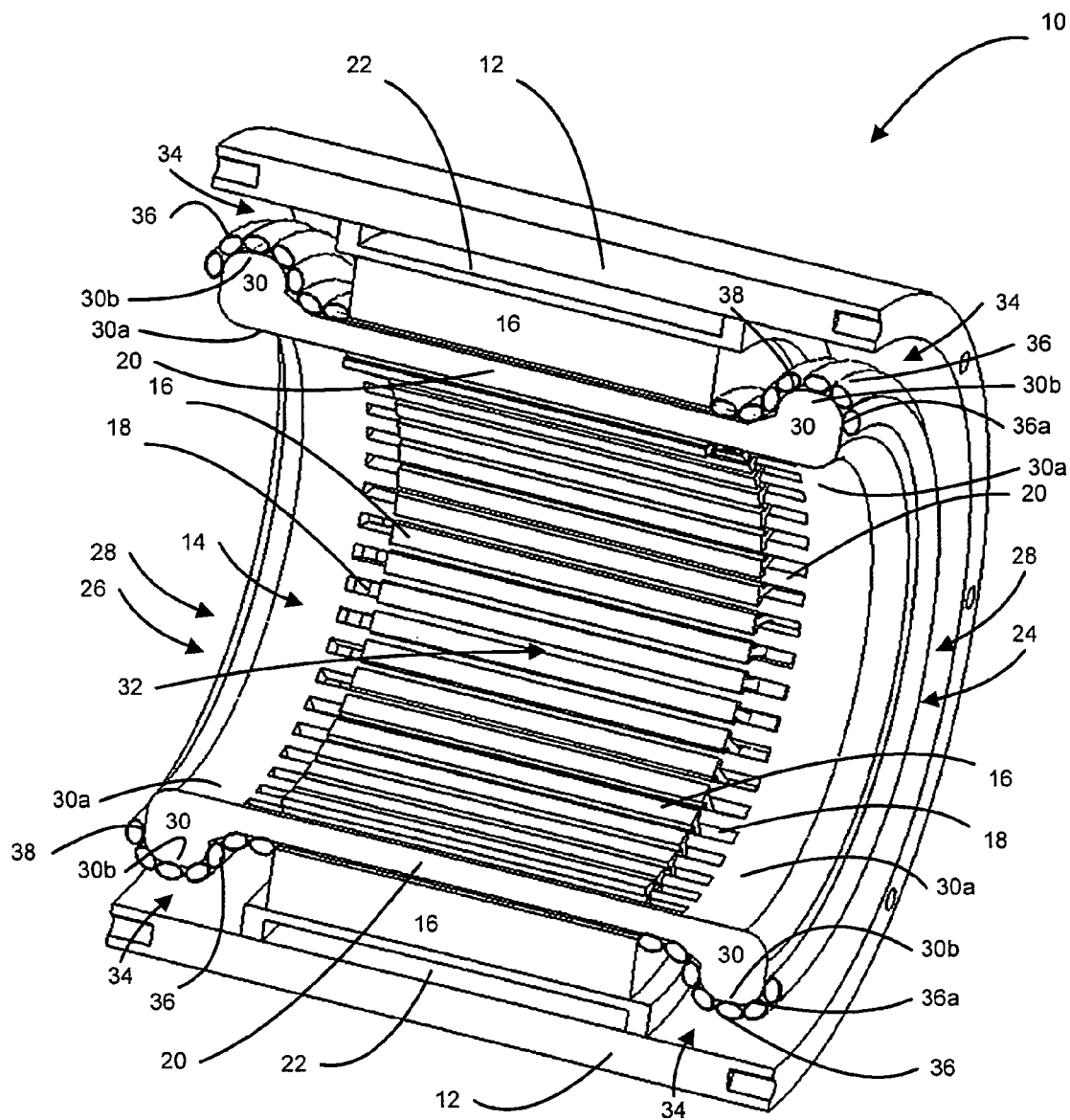
FIG. 1 is a cross-sectional perspective view of an electric motor constructed in accordance with the various embodiments of the present invention showing stator laminations, stator windings, winding end-turns and a plurality of cooling tubes.
Figure 2:
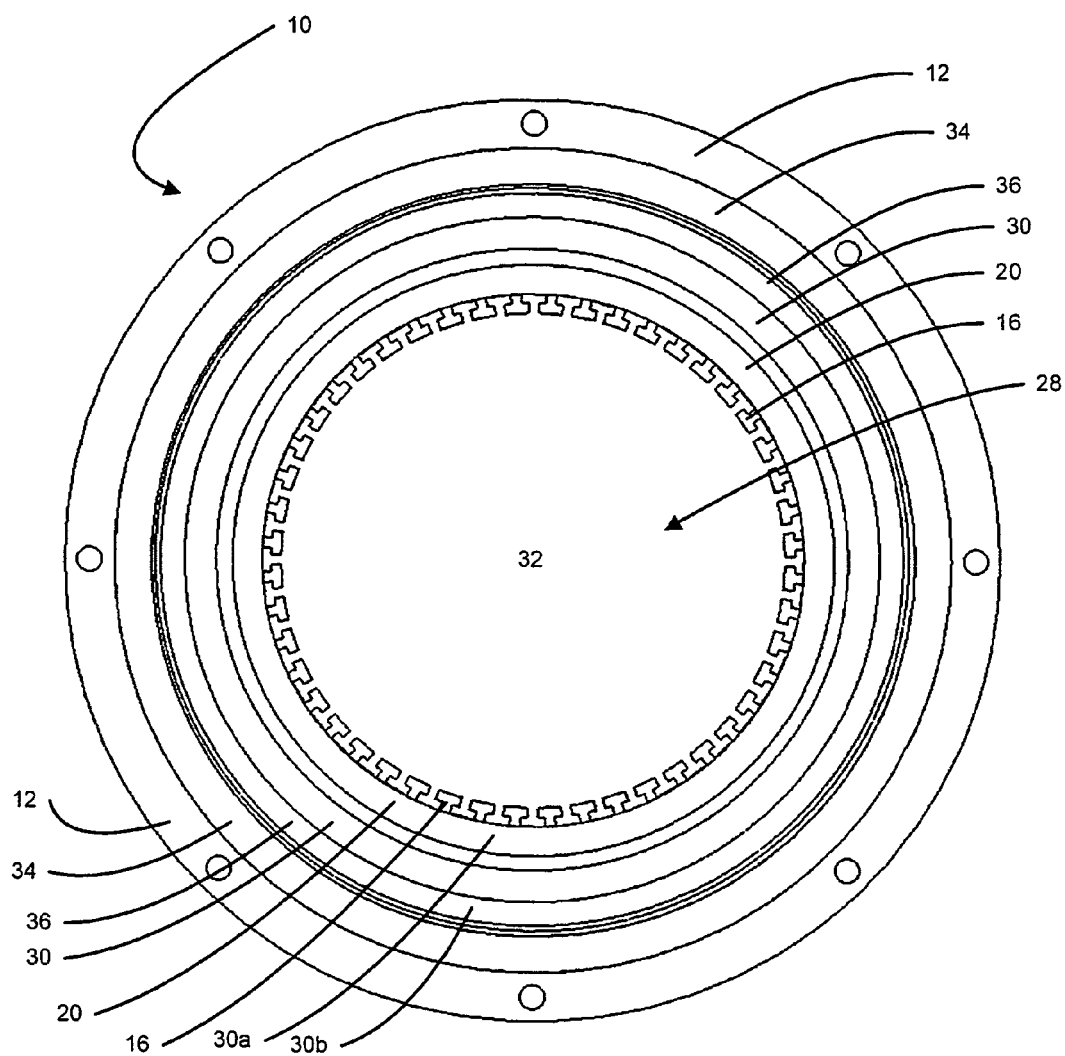
FIG. 2 is a front view of the electric motor of FIG. 1.

With reference to FIGS. 1 and 2, portions of an exemplary electric motor 10 are shown. The electric motor 10 includes a housing 12. The housing 12 contains the stator core 14. A stator core 14 can include a plurality of stator laminations 16 and a plurality of stator slots 18 formed within the stator laminations 16 in a manner known in the art. A plurality of electrically conductive wire windings 20 can be wound in and through the stator slots 18. A cooling jacket 22 can be disposed between the housing 12 and the stator core 14.

The wire windings 20 can be placed in the stator slots 18 and travel back and forth longitudinally between an opening face 24 and an opposed face 26, which can be collectively referred to as end faces 28. Winding end-turns 30 are formed as the wire windings 20 exit at the end faces 28 and are redirected into subsequent stator slots 18 and/or are redirected in and through the same stator slot 18. It can be appreciated that the winding end-turns 30 can be formed in an annular ring around the end faces 28, and abut the stator laminations 16. Moreover, the winding end-turns can include an inner periphery 30a adjacent to the stator core and an outer periphery 30b adjacent to the housing 12.

The stator core 14 also includes a rotor receiving opening 32. It can be appreciated that any suitable rotor (not shown in FIGS. 1 and 2) can be used in the electric motor 10, such as, but not limited to permanent-magnet rotors or squirrel-cage rotors. The winding end-turns 30 can occupy a portion of an open space 34 between the rotor receiving opening 32 and the housing 12. It can also be appreciated that there remains additional open space 34 between the winding end-turns 30 and the housing 12.

The stator laminations 16 are illustrated in FIGS. 1 and 2 as a solid annular ring about the stator core 14. The stator laminations 16, however, can be, for example, a plurality of thin laminations that can be sandwiched together to form the plurality of the stator laminations 16. Moreover, the wire windings 20 and end-turns 30 are illustrated in FIGS. 1 and 2 as a solid portion. The wire windings 20 and end-turns 30, however, can be, for example, a plurality of electrically-conductive wires that are wound through the stator slots 18.

The cooling jacket 22 can be disposed annularly between the stator laminations 16 and the housing 12. The cooling jacket 22 can contain coolant that is circulated throughout the cooling jacket 22 to draw heat from the electric motor 10. The coolant can include water, propylene glycol, ethylene glycol, oil and/or a suitable refrigerant and can be used in the coolant jacket 22 as a heat transfer medium to extract heat from the stator core 14. It can be appreciated that a mechanical cooling system can also be employed to cool the electric motor 10.

Figure 3:
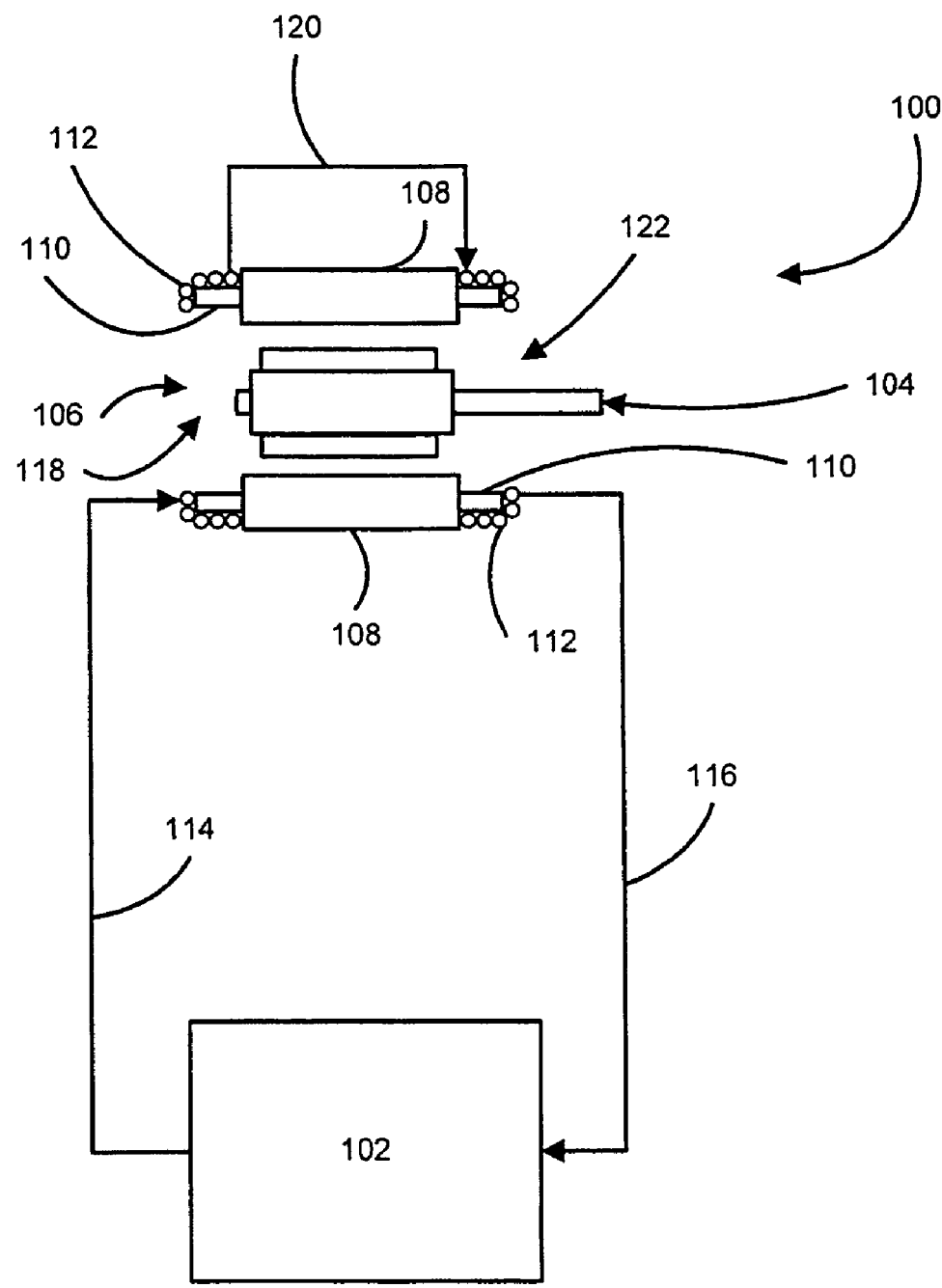
FIG. 3 is a schematic diagram of an exemplary cooling system for the electric motor constructed in accordance with the various embodiments of the present invention.
Figure 4:
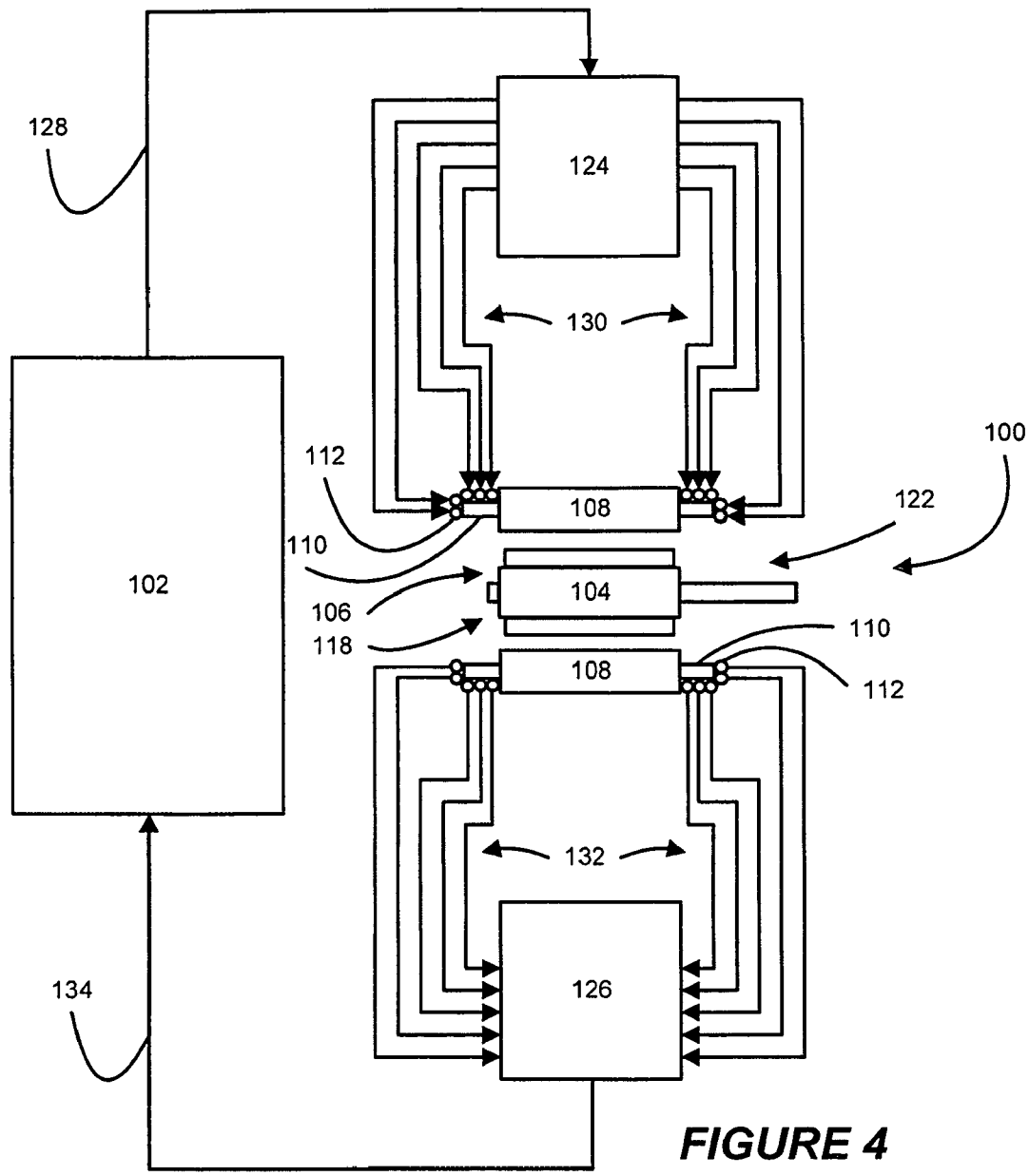
FIG. 4 is similar to FIG. 3 and includes an input cooling manifold and an output cooling manifold attached to the cooling tubes constructed in accordance with the various embodiments of the present invention.
Figure 5:
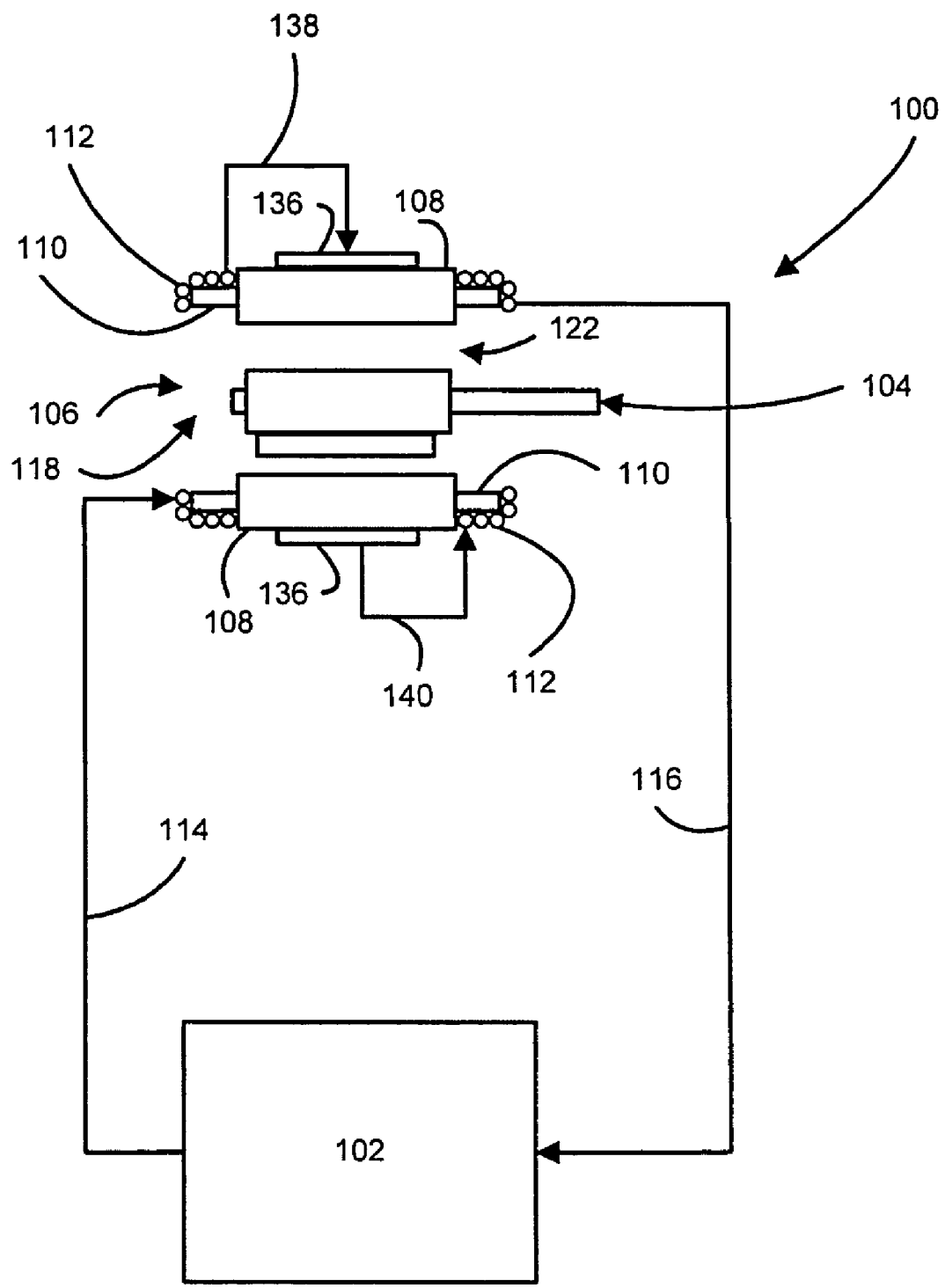
FIG. 5 is similar to FIG. 3 and includes a cooling jacket incorporated with the cooling system.
Figure 6:
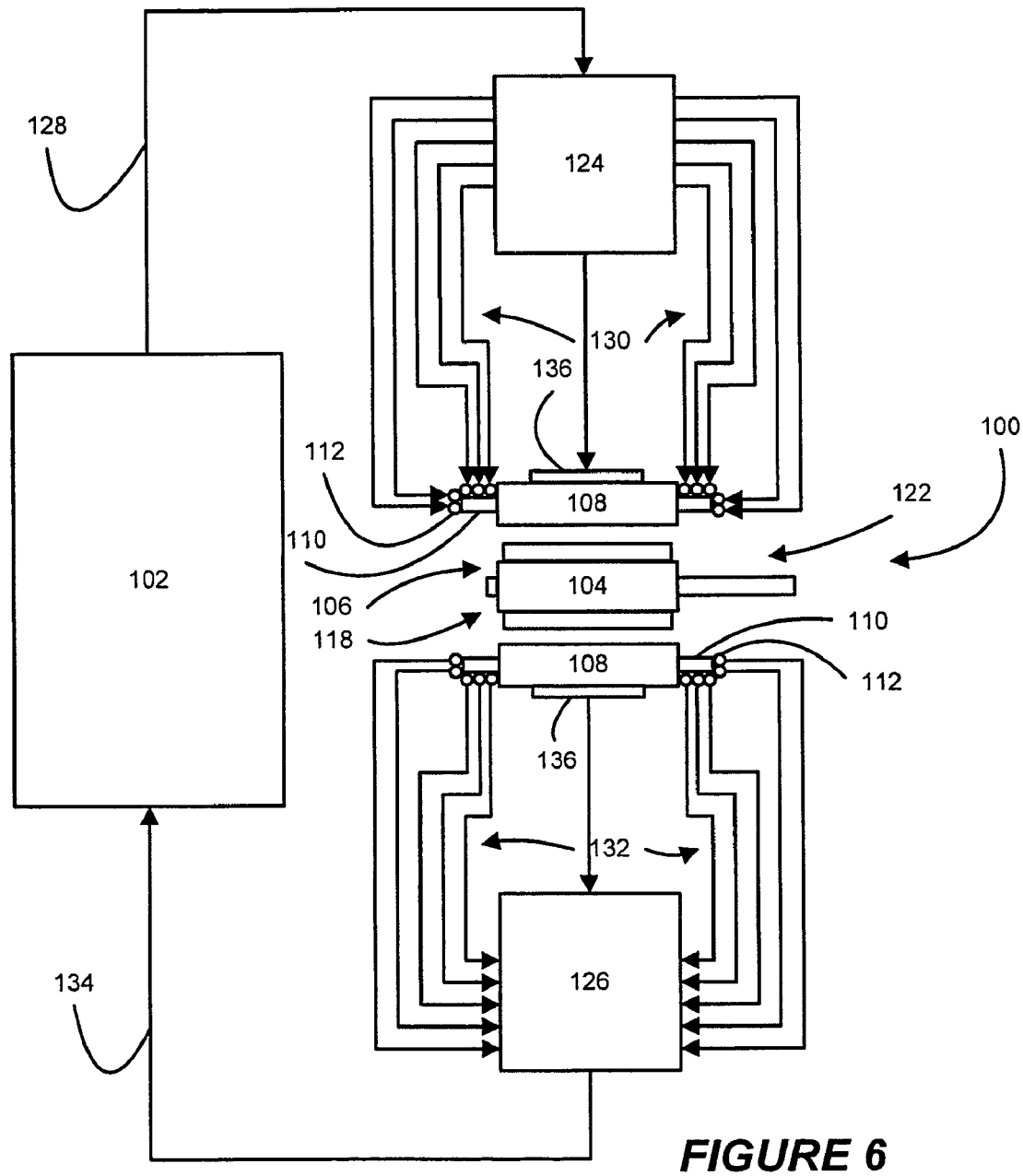
FIG. 6 is similar to FIG. 4 and includes the cooling jacket incorporated with the cooling system.

A plurality of cooling tubes 36 can be circumferentially disposed around the end-turns 30. It can be appreciated that the cooling tubes 36 can connect to the winding end-turns 30 at both the opening face 24 and the opposed face 26. More specifically, multiple cooling tubes 36 are placed circumferentially around the end-turns 30. For example, five tubes can be used as shown in FIGS. 4 and 6 or seven tubes can be used as shown in FIG. 1. Notwithstanding the illustrated examples, any number of cooling tubes 36 can be used, such that the number of cooling tubes 36 can be specific to an electric motor model and cooling capacity required. In other examples, a single cooling tube 36 can be used and wrapped multiple times around the end-turns 30, as illustrated in FIGS. 3 and 5.

The cooling tubes 36, for example, can be a thin wall plastic tube. The wall thickness of the cooling tube can have dimension that is about 0.012 inches (0.305 mm). It can be appreciated that the thickness of the tube wall can be any suitable thickness that promotes heat transfer from the end-turns 30 through the cooling tube 36 and into the coolant. In addition, the tube diameter can be small to ensure that the cooling tubes 36 can be wrapped around the end-turns 30 without kinking. It can also be appreciated that an exterior surface 36a of the cooling tubes 36 can contact the winding end-turns 30. The tube inner diameter can be, for example, 0.25 inches (6.35 millimeters). By way of example, the thickness of the tube wall can be about 5% of tube diameter. The cooling tubes 36 can be formed, for example, in a shape that is complimentary to the end-turns 30, which can avoid kinking when wrapping the cooling tubes 36 around the end-turns 30. It can further be appreciated that the cooling tubes 36 can have various cross-sectional shapes, for example, rectangular, triangular and other suitable multi-sided shapes.

The cooling tubes 36 can be made of a non-metallic material, for example, plastic, rubber or polytetrafluoroethylene (i.e., Teflon®). When the cooling tubes 36 are fabricated with Teflon®, the cooling tubes 36 can be etched with a chemical or mechanical process to promote adhesion. Etching can include removing some material from the cooling tube 36 to increase surface roughness and may replaces fluorine atoms with carbon. The cooling tubes 36 can also be made of metal. Metal with high electrical resistance is preferred, for example, a non-magnetic stainless steel or a cupra-nickel. Constructing the cooling tubes 36 out of a non-metallic material (e.g., Teflon®) is preferred to prevent eddy current losses around the cooling tubes 36 and the end-turns 30.

An adhesive 38 (FIG. 1) can be used to adhere the cooling tubes 36 to the winding end-turns 30. The adhesive 38 can be, for example, a thermally conductive adhesive to maximize the amount of heat that is rejected into the cooling tubes 36. The adhesive 38 can include, for example, thermal additives. The thermal additives can include, for example alumina, aluminum nitride, boron nitride, graphite and ceramics. The thermal additives can improve, for example, the thermal conductivity of the adhesive 38, which can improve the overall efficiency of a cooling system. Suitable adhesives include, but are not limited to, X32-2133 and KE-1867 products commercially available from Shin-Etso Chemical Co., Ltd. Of Tokyo, Japan. Other suitable adhesives include SE4451 product from Dow Corning Corp. and RTVS 3-95-1 from Insulcast of Roseland, N.J.

The cooling tubes 36 can connect to the winding end-turns 30 and can be positioned in the open space 34 between the winding end-turns 30 and the housing 12. It can be appreciated that no additional space is needed to install the cooling tubes 36 on the winding end-turns 30, which can otherwise be provided in traditional electric motors. Moreover, the cooling tubes 36 can be operable to additionally extract heat from the space 34 to further improve cooling of the electric motor 10. It can further be appreciated that placement of the cooling tubes (e.g., on the inner periphery 36a and/or the outer periphery 36b) 36 can be dictated by the size and geometry of the electric motor and additional cooling schemes (e.g., a rotor fan) that are specific the certain electric motor models.

With reference to FIG. 3, an exemplary schematic of an electric motor cooling system is shown. The cooling system can include an electric motor 100 that can be connected to a cooler 102. A rotor 104 can be disposed within a stator core 106. The stator core 106 can include stator laminations 108 and stator windings that extend from the stator laminations 108 and form winding end-turns 110. Cooling tubes 112 can be connected to the winding end-turns 110.

In this embodiment, a cooler output line 114 connects the cooler 102 to the cooling tube 112 on an opposed face 118 of the electric motor 100. Coolant flows through the cooling tubes 112 and exits through a bridge cooling line 120 and into the cooling tubes on an opening face 122. Coolant flows through the cooling tubes 112 on the opening face 122 and out to the cooler 102 unit through a cooler input line 116. The cooling tubes 112 on the opposed face 118 are a single tube in series with a single cooling tube on the opening face 122. By way of example, coolant can circulate from the cooler 102 through a single coolant tube 112 that can be wrapped multiple times around the winding end-turns 110 at the opposed face 118. The coolant then can circulate through the single cooling tube 112 wrapped multiple times around the winding end-turns 110 at the opening face 122 and returns to the cooler 102. It can be appreciated that in the arrangement as illustrated in FIG. 3, the cooling tubes are connected in a serial configuration.

With reference to FIG. 4, another embodiment of the cooling system is shown including a coolant output manifold 124 and a coolant input manifold 126. Output and input are used only so much as to define output from the cooler 102 and input into the cooler 102. An output manifold connection 128 connects the coolant output manifold 124 to the cooler 102. A plurality of manifold output lines 130 connect the coolant output manifold 124 to the cooling tubes 112 on both end faces 118, 122. It can be appreciated that multiple cooling tubes 112 can be positioned on the winding end-turns 110, such that each cooling tube 112 is connected to the respective manifold output lines 130. A plurality of manifold input lines 132 connects the cooling tubes 112 at both end faces 118, 122 to the coolant input manifold 126. An input manifold connection 134 connects the coolant input manifold 126 to the cooler 102. In contrast to the serial configuration illustrated in FIG. 3, coolant is circulated through each of the cooling tubes 112 in a parallel configuration in FIG. 4.

With reference to FIG. 5, another embodiment of the cooling system is shown that is similar to FIG. 3. The cooling system includes an annular cooling jacket 136 on the electric motor 100. In this embodiment, the cooler output line 114 delivers coolant from the cooler 102 to the cooling tubes 112, which connect to the end-turns 110 at the opposed face 118. A tube-to-jacket output line 138 connects the cooling tube 112 on the opposed face 118 to the cooling jacket 136. Coolant flows through the cooling jacket 136 and then out through a jacket-to-tube input line 140, which connects the cooling jacket 136 to the cooling tubes 112 on the opening face 122. A cooler input line 116 connects the cooling tubes 112 at the opening face 122 to the cooler 102. It can be appreciated that the single tube wrapped multiple times around the winding end-turns 30 at the opposed face 118 is arranged in a serial configuration with the cooling jacket 136 and the similarly configured cooling tubes 112 at the opening face 122.

With reference to FIG. 6, another embodiment of cooling system is shown that is similar to FIG. 4 but includes the annular cooling jacket 136. In this embodiment; the output manifold connection 128 connects the cooler 102 to the coolant output manifold 124. The plurality of manifold output lines 130 connects the coolant output manifold 124 to the plurality of cooling tubes 112 on both end faces 118, 122. One of the manifold output lines 130 also connects the coolant output manifold 124 to the cooling jacket 136. It can be appreciated that coolant flows through the cooling tubes 112 and the cooling jacket 136 in a parallel configuration similar to the system illustrated in FIG. 4. The plurality of the manifold input lines 132 connect the cooling tubes 112 at both end faces 118, 122 to the coolant input manifold 126. One of the manifold input lines 132 connects the cooling jacket 136 to the coolant input manifold 126. The input manifold connection 134 connects the coolant input manifold 126 to the cooler 102. It can be appreciated that the plurality of cooling tubes 112 at both end faces 118, 122 along with the cooling jacket 136 are cooled in the parallel configuration.

Figure 7:
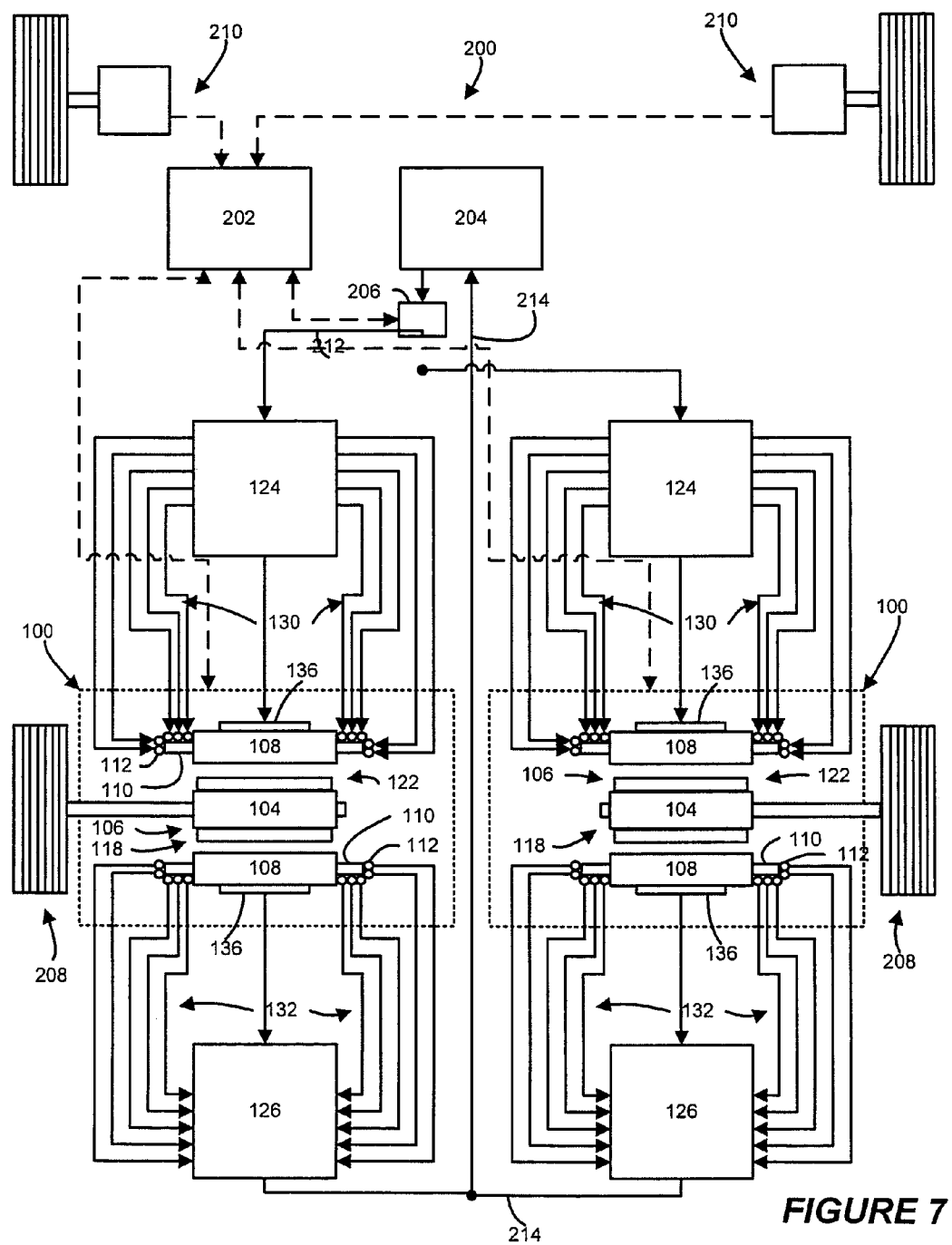
FIG. 7 is a schematic diagram of an exemplary vehicle constructed in accordance with the various embodiments of the present invention and includes electric motors that each drive respective wheels and the cooling tubes connected to the winding end-turns of each of the electric motors.

With reference to FIG. 7, another embodiment of the cooling system is shown with an exemplary vehicle 200. In this embodiment, the vehicle 200 includes a control module 202 and a radiator 204 that connects to a water pump 206, which circulates coolant throughout the vehicle 200. A pair of the electric motors 100 each drives respective wheels 208. While the exemplary vehicle 200 is illustrated with the pair of driven wheels 208 and a pair of non-driven wheels 210, an additional two exemplary electric motors 100 can similarly connect to the pair of wheels 210.

The water pump 206 and the radiator 204 circulate coolant to the coolant output manifolds 124 and from the coolant input manifolds 126 in a similar fashion to the cooler 102, as illustrated in FIGS. 4 and 6. A coolant output line 212 connects the water pump 206 to each coolant output manifold 124. The manifold output lines 130 connects the coolant output manifold 124 to the cooling tubes 112 and the cooling jacket 136 at each end face 118, 122. The manifold input line 132 connects the cooling tubes 112 and the cooling jacket 136 to the coolant input manifold 126. A coolant input line 214 connects each coolant input manifold 126 to the radiator 204. It can be appreciated that the control module 202 can communicate with the water pump 206 to regulate distribution of coolant throughout the vehicle 200. In addition, the control module 202 can communicate with each electric motor 100 to regulate, for example, output of the electric motor, which can regulate velocity of the vehicle 200.

Figure 8:
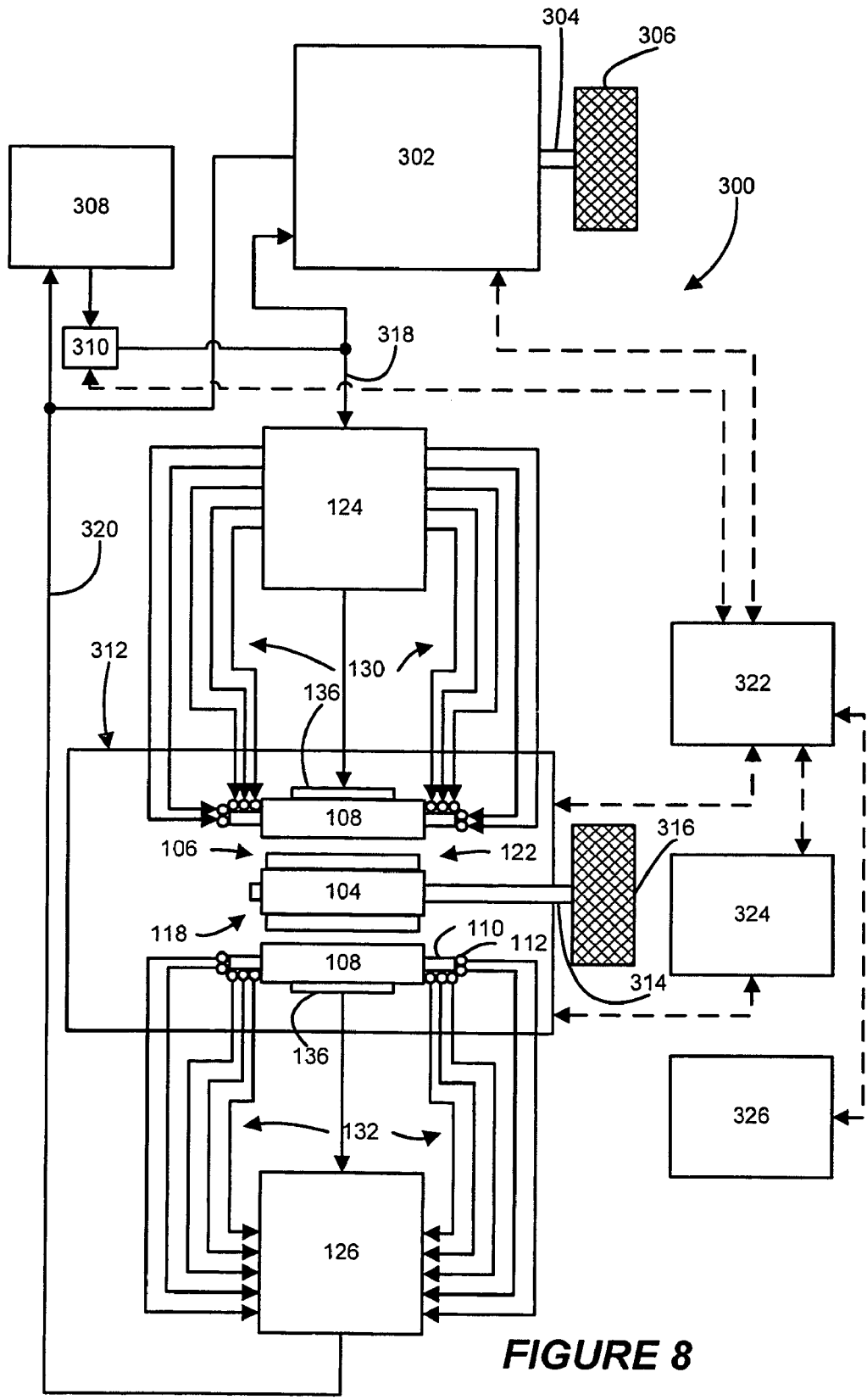
FIG. 8 is a schematic diagram of an exemplary engine constructed in accordance with the various embodiments of the present invention and includes an alternator driven by the engine and cooling tubes connected to the winding end-turns of the alternator.

With reference to FIG. 8, another embodiment of the cooling system is shown with an exemplary vehicle 300. In this embodiment, the vehicle 300 includes an internal combustion engine 302 having a crankshaft 304 and a crankshaft pulley 306. A radiator 308 connects to a water pump 310 that circulates coolant throughout the vehicle 300. An exemplary alternator 312, for example, includes the components of the exemplary electric motor 100, as illustrated in FIG. 6. The alternator 312 can supply, for example, electrical power to the vehicle 300 in a manner known in the art. The alternator 312 can include an alternator shaft 314 and an alternator pulley 316. The alternator pulley 316 connects to the crankshaft pulley 306 by a belt or chain (not shown but known in the art). It can be appreciated that the engine 302 rotates the crankshaft pulley 306, which, in turn, rotates the alternator pulley 316. Rotation of the alternator pulley 316 can cause the alternator 312 to generate electrical energy for use in the vehicle 300 in a manner known in the art.

The water pump 310 and the radiator 308 circulate coolant to the coolant output manifold 124 and from the coolant input manifold 126 in a similar fashion to the cooler 102, as illustrated in FIGS. 4 and 6. For example, a coolant output line 318 connects the water pump 310 to the engine 302 and the coolant output manifold 124. The manifold output lines 130 connect the output manifold 124 to the cooling tubes 112 and the cooling jacket 136 at each end face 118, 122. The manifold input line 132 connects the cooling tubes 112 and the cooling jacket 136 to the input manifold 126. A coolant input line 320 connects the radiator 308 to the engine 302 and the coolant input manifold 126.

A control module 322 can communicate, for example, with the water pump 310 to regulate distribution of coolant throughout the vehicle 300. The control module 322 can also regulate charging of a battery 324. It can be appreciated that the cooling of the alternator 312 permits, for example, increased production of electric power that can be made available to power myriad vehicular accessories 326, such as, but not limited to, sunroofs, multimedia entertainment systems, additional lighting, additional heating, additional cooling, massage seats and/or refrigeration.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An electric motor comprising:
   a housing defining an inner periphery;
   an annular cooling jacket connected to said inner periphery;
   a stator having a plurality of slots, said stator directly connected to said annular cooling jacket, said slots having slot ends and channels formed between said slot ends;
   a plurality of wire windings disposed in said slots;
   a plurality of winding end-turns formed by said wire windings adjacent to said slot ends, said plurality of winding end-turns defining an outer periphery;
   said stator, said inner periphery of said housing, and said outer periphery cooperating to form annular open spaces separated by said annular cooling jacket; and
   a cooling tube connected to said outer periphery of said winding end-turns, said cooling tube pre-formed in a shape that circumferentially approximates said outer periphery of said winding end-turns, said cooling tube and said annular cooling jacket operable to absorb heat from the electric motor.

2. The electric motor of claim 1 wherein said cooling tube encircles said winding end-turns with multiple turns, said pre-formed shape operable to adhere to said outer periphery of said winding end-turns.

3. The electric motor of claim 1 further comprising a heat removal system connected to said cooling tube and said annular cooling jacket and operable to remove heat from a cooling fluid.

4. The electric motor of claim 1 further comprising a heat removal system having a plurality of cooling tubes, said heat removal system fluidly connected to said plurality of cooling tubes and said annular cooling jacket in a parallel configuration.

5. The electric motor of claim 1 further comprising a heat removal system having a plurality of cooling tubes, said heat removal system fluidly connected to said plurality of cooling tubes and said annular cooling jacket in a serial configuration.

6. The electric motor of claim 1 wherein said cooling tube includes a wall having an interior surface and an exterior surface, a distance between said interior surface and said exterior surface defining a wall thickness, and an inner diameter, said wall thickness is about five percent of said inner diameter.

7. The electric motor of claim 6 wherein said wall thickness is about 0.012 inches (about 0.305 millimeters).

8. The electric motor of claim 6 wherein said inner diameter is about 0.25 inches (about 6.35 millimeters).

9. The electric motor of claim 1 further comprising an adhesive that adheres said cooling tube to said plurality of said winding end-turns.

10. The electric motor of claim 9 wherein said adhesive is thermally conductive.

11. The electric motor of claim 9 wherein said adhesive includes an additive that increases thermal conductivity of said adhesive, said additive includes one of alumina, aluminum nitride, boron nitride, ceramics and combinations thereof.

12. The electric motor of claim 1 wherein said cooling tube is made from a non-metal.

13. The electric motor of claim 12 wherein said cooling tube is made from polytetrafluoroethylene.

14. The electric motor of claim 12 wherein said cooling tube is etched to improve adhesion thereto.

15. The electric motor of claim 1 wherein said cooling tube is made from one of plastic, rubber and combinations thereof.

16. The electric motor of claim 1 wherein said cooling tube is made from a metal, said metal having greater electrical resistance than said wire windings.

17. The electric motor of claim 16 wherein said cooling tube is made from one of non-magnetic stainless steel, cupranickel, and combinations thereof.

18. A system comprising:
an internal combustion engine;
a water pump driven by said internal combustion engine;
a housing for the electric motor having an inner periphery, a first side, and a second side opposite said first side, said housing mounted adjacent said internal combustion engine;
a stator having a plurality of slots, said stator contained in said housing, each of said slots having a first slot end, a second slot end, and channels formed between said first slot end in said first side of said housing and said second slot end in said second end of said housing;
a plurality of wire windings disposed in each of said slots;
a first plurality of winding end-turns formed by said wire windings adjacent to said first slot end, said first plurality of winding end-turns defining a first outer periphery, said outer periphery and said inner periphery of said housing defining a first annular open space on said first side of said housing;
a second plurality of winding end-turns formed by said wire windings adjacent to said second slot end, said second plurality of winding end-turns defining a second outer periphery, said second outer periphery and said inner periphery of said housing defining a second annular open space on said second side of said housing, said annular cooling jacket disposed in said housing to physically separate said first annular open space on said first side of said housing from said second annular open space on said second side of said housing;
a first cooling tube encircling said first plurality of winding end-turns and fixedly connected to said first outer periphery thereof, said first cooling tube formed in a pre-determined shape that is a circumferential approximation of said first outer periphery of said first plurality of winding end-turns, said first cooling tube disposed in said first open space; and
a second cooling tube encircling said second plurality of winding end-turns and fixedly connected to said second outer periphery thereof, said second cooling tube formed in a pre-determined shape that is a circumferential approximation of said second outer periphery of said second plurality of winding end-turns, said second cooling tube disposed in said second open space, said first cooling tube, said second cooling tube, and said annular water jacket are connected to said water pump and are operable to absorb heat from the electric motor.

19. The system of claim 18, wherein said cooling tube has a wall thickness that is about five percent of said inner diameter of said cooling tube.

20. The system of claim 18, wherein said cooling tube is made from polytetrafluoroethylene.

21. The system of claim 18, wherein said cooling tube is etched to improve adhesion thereto.

22. The system of claim 18, wherein the electric motor is operable to at least in part provide propulsive force for the vehicle.

23. The system of claim 18, wherein said internal combustion engine is operable to at least in part provide propulsive force for the vehicle.

24. The system of claim 18, wherein the electric motor is operable to provide electric power and not propulsive force for the vehicle.

25. An electric motor comprising:
a housing having an inner periphery;
a stator having a plurality of slots, said slots having slot ends and channels formed between said slot ends, said stator contained in said housing;
a plurality of wire windings disposed in said slots;
a plurality of winding end-turns formed by said wire windings adjacent to said slot ends, said plurality of winding end-turns defining an outer peripheral surface;
said housing and said plurality of winding end-turns cooperating to define an open space between said inner periphery of said housing and said outer peripheral surface of said plurality of winding end-turns;
a cooling tube that encircles said plurality of winding end-turns, said cooling tube disposed in said open space, said cooling tube formed in a pre-determined shape that circumferentially approximates said outer peripheral surface of said plurality of winding end-turns and that is operable to adhere to said outer peripheral surface thereof, said cooling tube operable to absorb heat from said open space and said electric motor.

26. The electric motor of claim 25, wherein said cooling tube has a wall thickness that is about five percent of said inner diameter of said cooling tube.

27. The electric motor of claim 25, wherein said cooling tube is made from polytetrafluoroethylene.

28. The electric motor of claim 25, wherein said cooling tube is etched to improve adhesion thereto.

29. The electric motor of claim 25 further comprising an annular cooling jacket connected to said stator and disposed between said inner periphery of said housing and said stator.

30. The electric motor of claim 29 further comprising a heat removal system fluidly connected to said cooling tube and said annular cooling jacket in a parallel configuration.

* * * * *